United States Patent Office 2,955,595
Patented Oct. 11, 1960

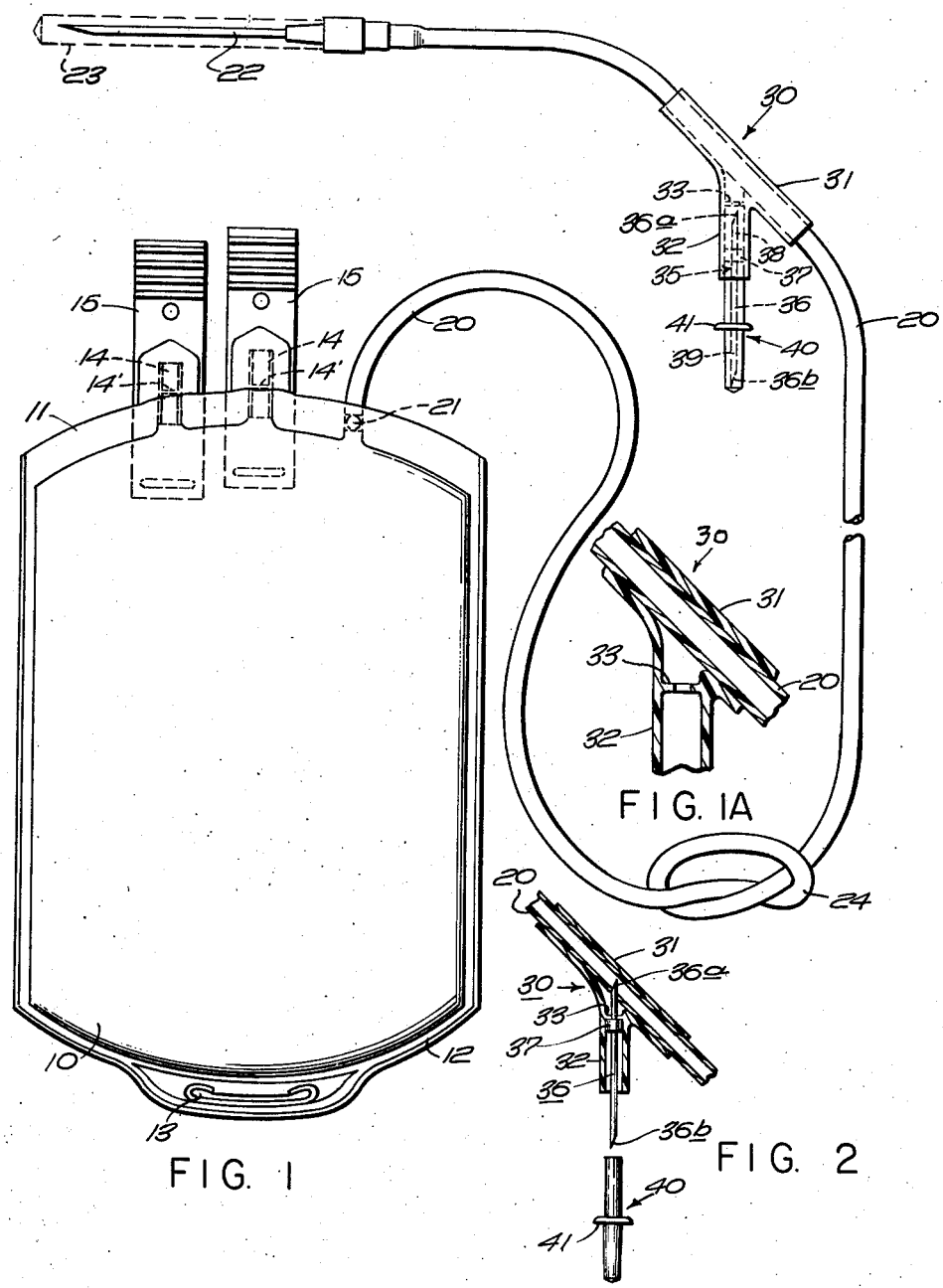

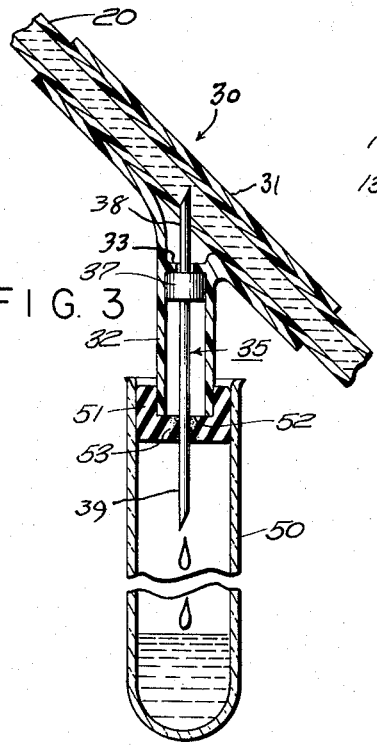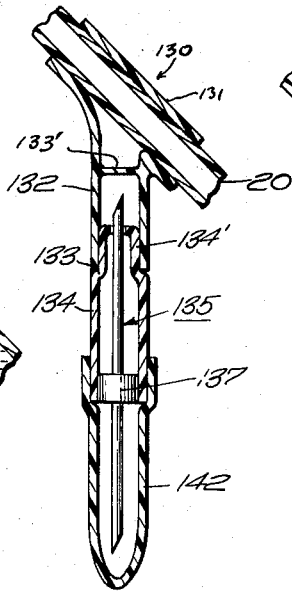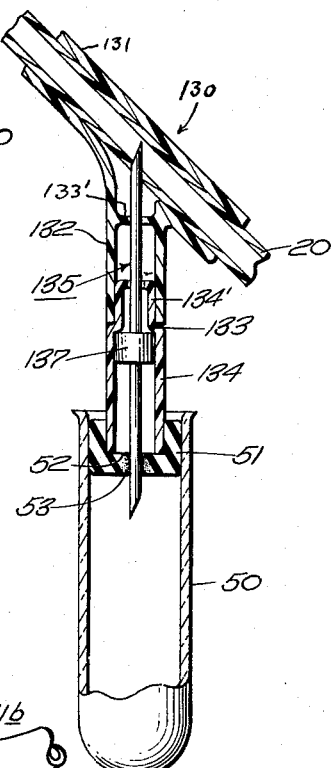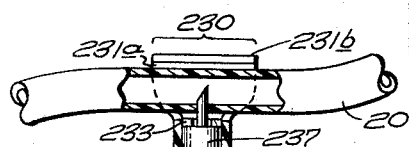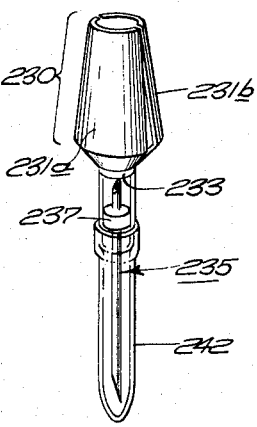

2,955,595
THERAPEUTIC FLUID SAMPLING MEANS

Robert J. Semple, Morris Township, Morris County, N.J., assignor, by mesne assignments, to Fenwal Laboratories, Inc.

Filed May 19, 1959, Ser. No. 814,267

10 Claims. (Cl. 128—214)

This invention pertains to equipment for sterile handling of therapeutic fluids, as in the collecting of blood into containers for storing and administering. More particularly it aims to provide in association with a line of flexible tubing for communicating with a fluid collecting container improved access means for obtaining sample quantities of the fluid, as for typing and cross-matching of blood and other purposes.

In the drawings illustrating by way of example certain embodiments of the invention:

Fig. 1 is an assembly view of a fluid receiver of the flexible bag type and including a receiving or donor tube with sampling coupler means installed in pre-use condition;

Fig. 1A is an enlarged detail sectional view of a portion of a coupling connector;

Fig. 2 is a sectional view corresponding to a portion of Fig. 1 illustrating a step in the use of the sample-taking means;

Fig. 3 is a sectional view on a larger scale like Fig. 2 showing a fluid sample being taken;

Fig. 4 shows a modified form of the sampling tubular means;

Fig. 5 illustrates the device of Fig. 4 with coupled ampoule, vial or test tube; and Figs. 6 and 7 show a further modification, wherein Fig. 6 shows separately a laterally applicable sampling coupler, and Fig. 7 represents such coupler installed upon a tubing length.

In connection particularly with the collection and storage of blood it is often required to segregate small volumes of the particular donation for testing or sampling and such purposes as typing, cross-matching and culturing. Desirably such sampling should be done with a minimum of exposure of the blood or other fluid to atmosphere or other possible source of contamination, also with a minimum disturbance to the fluid.

The device of the present invention affords simple and convenient means for accomplishing such sampling in any instance where the blood or other fluid is flowed through conduit tubing of the flexible plastic type. For explanatory purposes the invention is herein illustrated and described with reference to a blood collecting unit of the Fenwal flexible and flatwise collapsible bag type. It is fashioned of flexible transparent plastic sheet material which is heat-sealable, also capable of withstanding sterilizing temperatures and is of appropriate strength, toughness and impermeability and general compatibility to a blood or other therapeutic fluid, one example of such component material being a polyvinyl chloride.

As seen in Fig. 1 the donation storage container or bag 10 is of tubular form with integral or fused-sealed sides and ends including in the example shown a bar seal 11 at the end shown uppermost in the figure and a transverse seal 12 at the opposite end incorporating a reinforced hanger aperture 13. This fluid-receiving bag 10 has access tubular ports 14 through the end seal 11 covered by openable sheathes or removable covers 15, the ports desirably also being closed off as by puncturable diaphragms 14'.

The bag 10 is further equipped with a fluid collecting tube 20 having one end in communication with the bag interior as through the end seal 11. At said end the tube 20 is openably closed off as by a stainless steel bead 21 somewhat oversized to the internal diameter of the tubing and sealed in it. The constituent material of the tube 20 may be the same as for the bag 10, in a diameter and wall thickness such that the tubing is resilient and self-supporting or non-layflat so as normally to present a hollow lumen.

The other end of the bag-communicating tube 20 is adapted to receive and in the illustrated example is equipped with a hypodermic needle 22 shown as of the opposed double-hub type with one hub seated in the adjacent end of the tube 20 and the other hub carrying a seating sheath 23 enclosing the piercing end of the needle.

In accordance with the present invention the container-communicating tube 20, constituting the donor or collecting tube of the assembly unit as employed for taking a blood donation, is novelly equipped for sampling purposes with manipulable tubular means whereby specimens of the blood may be taken off at any convenient point or points along the tube and without disturbing any other portion of the equipment.

Such sampling device comprises a branched or bifurcate tubular body 30 preferably of molded plastic of clear or translucent nature, relatively rigid as compared to the flexible tubing 20 and desirably such as to withstand heat sterilization.

In the example of Figs. 1 to 3 the branched tubular body 30 is of general Y-form, comprising a straight main tube or sleeve 31 of inner diameter for tight sliding fit about the outer wall of the tube 20, and a laterally offset communicating tubular branch 32 of approximately the same inner and outer diameter as and integral with the sleeve 31.

This sampling connector or adapter element 30 is operatively assembled in the illustrated unit by sliding it onto the tubing 20 from the free end thereof before installation of the needle 22 and moving it along to the desired location. Generally for convenient handling this connector 30 is placed somewhat nearer the needle end of the tube, as for example in Fig. 1, and that end of the sleeve 31 which forms the stem of the Y is directed toward said needle end so as to be upstream with respect to incoming fluid flow.

Otherwise stated the branch 32 projects at an acute angle from the sleeve 31 so as to diverge in the direction of fluid flow in the tubing 20, with the included angle toward the outlet end of the tubing.

In the example of Figs. 1 to 3 the juncture of the tubular branch 32 with the sleeve 31 is such that the inner end of the branch 32 opens into the bore or lumen of the sleeve 31, the two parts having their internal passages in flow communication. Thus with the device installed as upon the tube 20 the adjacent tubular wall of the latter stands directly across the open inner end of the branch 32.

Mounted in the branch 32 in a cannula unit 35 comprising a double-ended cannula 36 pointed as at 36a, 36b, at each end and carried axially by a hub or plug 37 having a tight sliding fit with the inner wall of the branch 32. While the relative longitudinal dimensions of the cannula and the branch 32 may be varied, the cannula has an inner end portion 38, inwardly beyond the hub 37, such that the cannula unit has an installed normal or inactive position, Fig. 1, wherein the inner cannula end 38 and the carrier hub 37 are housed in the branch 32 and an outer end portion 39 of the cannula projects from the latter. In the interests of compactness unnecessary length is avoided, and generally the inner end portion 38 of the cannula is somewhat shorter than the outer portion 39 beyond the hub 37. In said normal installed position the length of the inner cannula portion 38 beyond the hub 37 is less than the axial distance from the inner end face of the hub 37 to the adjacent wall of the tubing 20, so that normally the cannula inner point 36a stands spaced from said tubing.

For taking a sample of fluid from the tubing 20 the cannula unit 35 is adapted to be thrust inward so that said inner cannular point 36a will pierce the tubing wall and enter and stand free within the tubing lumen. For limiting such inthrusting movement there is provided on the inner wall of the branch 32 an inward projection in the form of a circumferential rib or series of nubs 33 adapted to serve as stop means by abutment with the inner end face of the hub 37. With the hub and said stop means in such abutted engagements, Figs. 2 and 3, the cannula unit 35 is halted with its inner end 36a within the lumen of tubing 20 but held out of contact with the opposite tubing wall. It is thus entered into flow communication with fluid in the tubing 20.

For manipulating the cannula unit 35 as above described the device further comprises an elongate tubular plunger 40 closed at the outer end to provide an enclosure or sheath for the projecting portion of the cannula unit 35. This cannula sheathing plunger 40 is open at the inner end and there has an outer diameter for entrance into the bore of the branch 32 and of an inner diameter to encompass the cannula in radially spaced relation to it. At a determined intermediate location the plunger 40 has fixed on it an annular collar 41 which along with the plunger portion outwardly of the collar provides a convenient manipulating grip. Said collar 41 further serves as a limiting stop for the inthrusting movement of the plunger, and hence of the cannula unit, it being so located that the plunger length inwardly beyond the collar 41 equals the distance from the outer end of the connector branch 32 to the outer face of the cannula hub 37 when the cannula unit is thrust fully inward to fluid-communicating position, Fig. 2. Thus abutment of the plunger collar 41 against the outer end of the branch 32 in itself additionally prevents further excessive inward movement of the cannula unit 35.

The sampling equipment or device as a whole including the described connector unit 30 further comprises one or more collecting vessels, ampoules or vials 50 adapted to be sealed in a partially vacuumized or negative pressure internal status, one convenient form for which is that of the usual test tube, adapted for centrifuging purposes. Such sample receiver 50, one of which is shown installed in use position in Fig. 3, is provided at the receiving end with a closure shown as a stopper or bushing 51 of resilient material adapted to support the mentioned vacuumized condition, and having at the outer face a central recess 52 for tight seating reception of the outer end of the connector branch 32. The bushing 51 or at least the central portion 53 thereof is formed to be readily puncturable by the pointed outer end cannula. Following insertion of the inner end 36a of the cannula into the flow-communicating position of Fig. 2, the plunger 40 is bodily withdrawn, leaving the projecting portion of the cannula and the outer end of the connector branch 32 in position for assembly with the sample receiver or vial 50 as shown in Fig. 3. By then bringing the stoppered end of the sampling vial 50 into axial line with the cannula and the connector branch 32 and relatively telescoping the vial and the cannula the outer point 36b of the latter is thrust through the vial closure 51 and the connector branch 32 seats connectively in the central recess 52 of said closure. The described stop means 33 at the inner wall of the connector branch 32 at this time supplies abutment for the cannula hub 37, blocking cannula movement toward the tubing 20 and causing the outer cannula point 36b to be pierced through the vial closure 51 and into the vial 50, into the sample-receiving position of Fig. 3.

In the use of the assembly of Figs. 1 to 3, the sheath 23 is removed from the phlebotomy needle 22 and the latter inserted into a vein of the donor, preferably after first forming a loose throw-knot 24 in the tubing 20 between the bag and the sampling device 30. Taking of a sample quantity of the blood into the vacuumized sample tube or vial 50 may be accomplished at any preferred time with reference to filling of the storage container or bag 10. Conveniently it is accomplished after collection of the desired quantity of the blood into the bag 10. The tubing 20 may then be closed off between the bag and the sampling device 30 as by drawing tight the mentioned throwknot 24.

With the phlebotomy needle 22 still applied to the donor the sampling cannula unit 35 is pierced into the lumen of the tubing 20, by pushing the sheathing plunger 40 inward to the described stop limit, Fig. 2, then bodily removing the plunger 40 and installing the vacuumized vial or sample-receiving tube 50 by piercing the outer pointed end 36b of the cannula unit through the closure 51 and seating the outer end of the connector branch 32 in the recess 52 of the sampling tube closure. The sampling tube with collected fluid sample may be retained with the tubing 20, the latter being clamped off between the sampling device 30 and the phlebotomy needle or if preferred the sampling tube may be removed from the projecting branch 32 of the tubular unit, the pierceable central portion 53 of the sample tube closure being self-sealing upon withdrawal of the cannula unit 35.

In the embodiment of Figs. 4 and 5 the sampling tube 130 is generally similar to that of Figs. 1 to 3 including a transverse sleeve 131 and a branch 132 in a construction and arrangement facilitating application of the sampling tube 50 and entrance of the cannula unit 135 into the tubing 20 at substantially the same time, in a single operation. The lateral branch 132 is provided with an integral or other tubular extension 134 having a reduced inner end 134' received in the inner portion 132 of the branch, the apertured end wall of said reduced portion 134' providing a slide bearing for the cannula unit 135. Inwardly beyond the inner cannula point, at a location corresponding to that of the stop shoulder 33 of Figs. 1 to 3, the branch 131 may be formed with a transverse sealing membrane or diaphragm 133' readily pierceable by the cannula in obtaining a fluid sample. It will be understood that likewise in the other embodiments such as Figs. 1 to 3 and Figs. 6, 7 a closed or non-apertured transverse wall may be provided in lieu of or in addition to the apertured shoulder stops 33 and 233.

The cannula hub 137 in Figs. 4 and 5 is somewhat further spaced from the inner end of the cannula than in Figs. 1 to 3, being normally held in the tubular extension 134 near the outer end thereof as in Fig. 4. A removable cap 142 encloses the projecting portion of the cannula.

In the use of the device of Figs. 4 and 5 the cap 142 is removed and the sampling tube or vial 50 is placed in axial line with the cannula unit 135. Upon then pushing the sampling tube and the connector device 30 axially toward each other the inner end of the cannula is pierced through the wall of the tubing 20 and into the lumen thereof while in the same operation the outer end of the cannula is thrust through the pierceable central portion 53 of the closure 51.

The sample tube closure 51, being somewhat less readily penetrable than the wall of the tubing 20, opposes initial resistance until the inner end of the cannula has entered the tubing 20 and the cannula hub 127 has come into abutting relation with the reduced inner portion of the branch extension serving as a stop 133 therefor. Continued relative telescoping pressure with said stop means 133 acting as abutment then causes the other end of the cannula to pierce the closure 51 and enter the sampling tube 50, substantially as in Fig. 5.

If desired the cannula 135 may be handled as a unit with the sampling tube 50, the connector branch extension 134 in such case being made separable from the connector branch proper 32 and being provided with a cannula-covering cap similar to that of Fig. 4 but oppositely applied and adapted to fit the reduced inner portion of the branch extension 134. In such instance the outer end of the branch 32 may contain a sterile cotton plug, separable cap or other removable sealing closure.

In the further embodiment of Figs. 6 and 7 the cannula unit 235, sampling tube 50 and tubing connector or adapter 230 are constructed and arranged for lateral application at any selected location along the tubing 20. The connective means 230 comprises a main tube 231 adapted for application to the tubing 20 with the axes of the connector tube 230 and of the tubing 20 at substantially right angles to each other. The end of the connector tube 230 spaced from the closure 51 of the sampling tube 50 is integrally or otherwise formed with divided tab-like portions 231a, 231b in opposed relation and of bendable material adapting them to be separated for reception of the tubing 20 between them in the direction transversely across the inner end of the cannula supporting tube 231. Following such application of the device to the tubing 20 these tab portions are bent reversely toward each other and around the tubing 20 thereby to retain the connector unit in the installed position on the tubing substantially as in Fig. 7. The connector tube 231 is formed with an integral stop projection 233 for limiting penetration of the cannula into the tubing generally similarly as in Figs. 1 to 3, and is operable by an insertible cannula-sheathing plunger, Fig. 6, similar to the plunger 40 of Figs. 1 to 3.

My invention is not limited to the particular embodiments thereof illustrated and described herein, and I set forth its scope in my following claim.

I claim:

1. A fluid sampling device for a flexible plastic conduit for therapeutic fluid, comprising a relatively rigid molded plastic hollow tubular body including a main tube and a communicating offset tube projecting laterally from an intermediate portion of the main tube, a pointed cannula and carrier hub therefor slidably supporting the cannula axially in the offset tube with the inner end portion of the cannula inwardly beyond the hub and normally spaced a determined distance from the inner end of said offset tube, and stop means on the offset tube positioned to limit inward stroke of the cannula to not exceeding said normal spacing distance plus the radius of the main tube outer wall.

2. A fluid sampling device for a flexible plastic conduit for therapeutic fluid, comprising a relatively rigid molded plastic hollow tubular body including a main tube and a communicating offset tube projecting laterally from an intermediate portion of the main tube, a pointed cannula and carrier hub therefor slidably supporting the cannula axially in the offset tube with the inner end portion of the cannula inwardly beyond the hub and normally spaced a determined distance from the inner end of said offset tube, a rigid tubular plunger having one end slidably received around the cannula in the offset tube and the other end projecting outwardly from the offset tube, said plunger adapted to be pushed inwardly to engage the cannula hub for thrusting the cannula inwardly, and means delimiting said cannula movement to locate the cannula inner end in free position adjacent the main tube axis.

3. A fluid sampling device according to claim 2 wherein said delimiting means comprises a projection at the inner wall of the offset tube in abuttive relation to the inner end wall of the cannula hub.

4. A fluid sampling device according to claim 2 wherein said delimiting means comprises an annular collar on the plunger engageable with the offset tube to limit inthrust of the plunger to the length of inward travel desired for the cannula.

5. A fluid sampling device for a flexible plastic conduit for therapeutic fluid conduit, comprising a relatively rigid molded plastic hollow tubular body including a main tube and a communicating offset tube projecting laterally from an intermediate portion of the main tube, a double pointed ended cannula and intermediate carrier hub therefor slidably supporting the cannula axially in the offset tube with a portion of the cannula inwardly beyond the hub and having the corresponding pointed end normally spaced a determined distance from the inner end of said offset tube, stop means on the offset tube abuttively interengageable with the cannula hub to block inthrusting movement of the cannula when the inner end thereof has laterally entered the lumen of the main tube, and a fluid sample receiver having a cannula-pierceable closure with a recess in which is seatingly received the offset tube when the adjacent cannula end is pierced through the closure.

6. In combination, a flexible and resilient plastic tubing for sterile conduct of therapeutic fluid, the tubing having inlet and outlet ends, and fluid sampling means carried by the tubing between the ends thereof and comprising a relatively rigid molded plastic branched body including a tubular sleeve encompassing the tubing with a tight sliding fit and a laterally offset tubular branch communicating with an intermediate portion of said sleeve, a cannula unit comprising a piston-like plug having a tight sliding fit in the branch and carrying axially thereof a cannula pointed at each end, the cannula unit normally positioned with the inner end spaced from the tubing wall at the inner end of the tubular branch, and stop means carried at the inner wall of the branch for limiting inward movement of the plug and cannula, the stop means being so located and the portion of the cannula inward of the carrier plug being of determined length such that inthrusting of the plug toward the tubing and into abutment with the stop means pierces the cannula inner end through the adjacent tubing wall and halts it short of engagement with the opposite wall of the tubing thereby to establish flow connection with the tubing lumen.

7. The combination according to claim 6 wherein the offset tubular branch is laterally disposed with respect to the tubular sleeve so as to diverge therefrom at an acute angle toward the outlet end of the tubing.

8. The combination according to claim 6 wherein the axes of the sleeve and the branch are substantially normal to each other.

9. The combination according to claim 8 wherein the sleeve comprises divided terminal portions receiving the tubing between them and oppositely bent into sleeve-forming encompassing relation to the tubing.

10. The combination according to claim 6 wherein the laterally offset tubular branch includes a tubular outward extension which slidably receives the cannula-carrying piston-like plug with the outer end portion of the cannula projecting beyond the extension, said extension having a removable enclosure cap for the projecting cannula portion and being adapted on removal of such cap to present the cannula for coupling to a sample receiver.

No references cited.